(12) United States Patent
Abe et al.

(10) Patent No.: US 10,898,953 B2
(45) Date of Patent: Jan. 26, 2021

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Satoshi Abe, Osaka (JP); Isao Fuwa, Osaka (JP); Mikio Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 264 days.

(21) Appl. No.: 16/083,374

(22) PCT Filed: Mar. 8, 2017

(86) PCT No.: PCT/JP2017/009205
§ 371 (c)(1),
(2) Date: Sep. 7, 2018

(87) PCT Pub. No.: WO2017/154971
PCT Pub. Date: Sep. 14, 2017

(65) Prior Publication Data
US 2019/0076923 A1 Mar. 14, 2019

(30) Foreign Application Priority Data
Mar. 9, 2016 (JP) .................. 2016-045898

(51) Int. Cl.
*B33Y 10/00* (2015.01)
*B29C 64/153* (2017.01)
(Continued)

(52) U.S. Cl.
CPC ............ *B22F 3/1017* (2013.01); *B22F 3/105* (2013.01); *B22F 3/1055* (2013.01); *B22F 3/16* (2013.01);
(Continued)

(58) Field of Classification Search
None
See application file for complete search history.

(56) References Cited

U.S. PATENT DOCUMENTS 6,815,636 B2  11/2004  Chung et al.
6,930,278 B1 * 8/2005  Chung ................. B29C 64/393
219/121.85
(Continued)

FOREIGN PATENT DOCUMENTS

CN    201300207 Y    9/2009
CN    101985176 A    3/2011
(Continued)

OTHER PUBLICATIONS

Foreign Office Action received in corresponding Korean Patent Application No. 2018-7025817, dated Jan. 17, 2020.
(Continued)

*Primary Examiner* — Mary Lynn F Theisen
(74) *Attorney, Agent, or Firm* — Greenblum & Bernstein, P.L.C.

(57) ABSTRACT

There is provided a manufacturing method of a three-dimensional shaped object, the method being capable of reducing a warp deformation of the three-dimensional shaped object. The manufacturing method according to an embodiment of the present invention produces a three-dimensional shaped object by alternate repetition of a powder-layer forming and a solidified-layer forming on a base plate, wherein the forming of at least one prior solidified layer is performed under a higher temperature condition than that for the forming of a subsequent solidified layer, the at least one prior solidified layer being formed prior to the subsequent solidified layer.

3 Claims, 7 Drawing Sheets

(51) Int. Cl.
| | |
|---|---|
| *B22F 3/105* | (2006.01) |
| *B22F 3/10* | (2006.01) |
| *B29C 67/00* | (2017.01) |
| *B29C 33/38* | (2006.01) |
| *B22F 3/16* | (2006.01) |
| *B33Y 30/00* | (2015.01) |

(52) U.S. Cl.
CPC ............ *B29C 33/38* (2013.01); *B29C 64/153* (2017.08); *B29C 67/00* (2013.01); *B33Y 10/00* (2014.12); *B22F 2003/1058* (2013.01); *B33Y 30/00* (2014.12)

(56) References Cited

U.S. PATENT DOCUMENTS

| | | | |
|---|---|---|---|
| 7,255,830 | B2 | 8/2007 | Abe et al. |
| 8,017,070 | B2 | 9/2011 | Low et al. |
| 2004/0200816 | A1 | 10/2004 | Chung et al. |
| 2004/0228754 | A1 | 11/2004 | Abe et al. |
| 2009/0208361 | A1 | 8/2009 | Low et al. |
| 2012/0041586 | A1 | 2/2012 | Abe et al. |
| 2015/0268099 | A1* | 9/2015 | Craig .................... G01J 5/0003 374/130 |
| 2016/0108483 | A1* | 4/2016 | Meyer ...................... C21D 1/00 148/525 |
| 2018/0079033 | A1* | 3/2018 | Krueger ............. B23K 15/0086 |
| 2019/0030791 | A1* | 1/2019 | Reznik ................. B29C 64/153 |

FOREIGN PATENT DOCUMENTS

| | | |
|---|---|---|
| CN | 102000821 A | 4/2011 |
| CN | 105149583 A | 12/2015 |
| JP | 2004-142427 | 5/2004 |
| JP | 2004-306612 | 11/2004 |
| JP | 2008-307895 | 12/2008 |
| JP | 2010-527409 A | 8/2010 |
| JP | 2010-196099 | 9/2010 |
| JP | 2015-101739 | 6/2015 |
| WO | 2010/098479 A1 | 9/2012 |

OTHER PUBLICATIONS

Chinese Office Action and Search Report received in Chinese Patent Application No. 201780015849.8.
Official Communication issued in International Bureau of WIPO Patent Application No. PCT/JP2017/009205, dated May 9, 2017.
International Preliminary Report on Patentability for PCT/JP2017/009205, dated Sep. 11, 2018, with English language translation.
Chinese Office Action received in 201780015849.8, dated Jun. 22, 2020 and English language translation.
Korean Office Action received in 10-2018-7025817, dated Jul. 30, 2020 and English language translation.

* cited by examiner

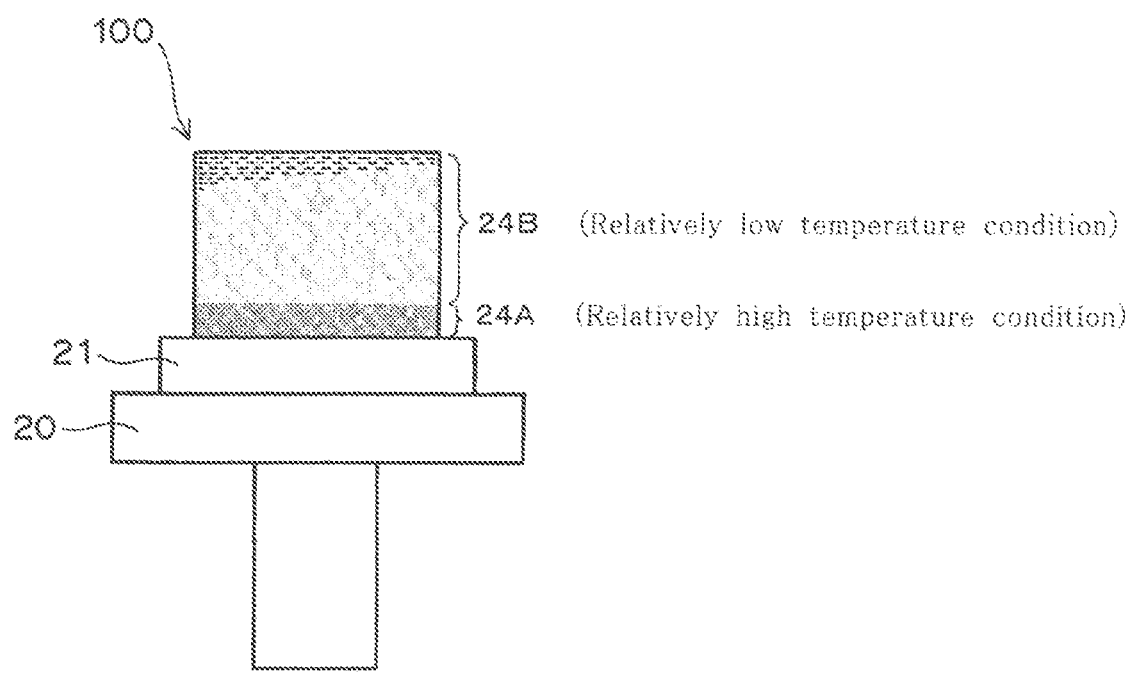

METHOD FOR MANUFACTURING THREE-DIMENSIONAL SHAPED OBJECT

TECHNICAL FIELD

The present invention relates to a method for manufacturing a three-dimensional shaped object. More particularly, the present invention relates to a method for manufacturing a three-dimensional shaped object, in which a formation of a solidified layer is performed by an irradiation of a powder layer with a light beam.

BACKGROUND OF THE INVENTION

Heretofore, a method for manufacturing a three-dimensional shaped object by irradiating a powder material with a light beam has been known (such method can be generally referred to as a "selective laser sintering method"). The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the predetermined portion of the powder or a melting and subsequent solidification of the predetermined portion; and (ii) forming another solidified layer by newly forming a powder layer on the formed solidified layer, followed by similarly irradiating the new powder layer with the light beam.

This kind of the manufacturing technology makes it possible to produce the three-dimensional shaped object with its complicated contour shape in a short period of time. The three-dimensional shaped object can be used as a metal mold in a case where inorganic powder material (e.g., metal powder material) is used as the powder material. While on the other hand, the three-dimensional shaped object can also be used as various kinds of models or replicas in a case where organic powder material (e.g., resin powder material) is used as the powder material.

Taking a case as an example wherein the metal powder is used as the powder material, and the three-dimensional shaped object produced therefrom is used as the metal mold, the selective laser sintering method will now be briefly described. As shown in FIGS. 6A-6C, a squeegee blade 23 is forced to move, and thereby a powder layer 22 with its predetermined thickness is formed on the base plate 21 (see FIG. 6A). Then, a predetermined portion of the powder layer 22 is irradiated with a light beam "L" to form a solidified layer 24 therefrom (see FIG. 6B). Another powder layer 22 is newly provided on the solidified layer 24 thus formed, and is irradiated again with the light beam to form another solidified layer 24. In this way, the powder-layer forming and the solidified-layer forming are alternately repeated, allowing the solidified layers 24 to be stacked with each other (see FIG. 6C). Such alternate repetition of the powder-layer forming and the solidified-layer forming leads to a production of a three-dimensional shaped object with a plurality of the solidified layers 24 integrally stacked therein. The lowermost solidified layer 24 can be provided in a state of adhering to the surface of the base plate 21. Therefore, there can be obtained an integration of the three-dimensional shaped object and the base plate 21. The integrated "three-dimensional shaped object" and "base plate" can be used as the metal mold as they are.

PATENT DOCUMENTS (RELATED ART PATENT DOCUMENTS)

PATENT DOCUMENT 1: Japanese Unexamined Patent Application Publication No. 2008-307895

DISCLOSURE OF THE INVENTION

Problems to be Solved by the Invention

In the selective laser sintering method, the irradiated portion of the powder layer with the light beam transforms into the solidified layer 24 through a sintering phenomenon or a melting and subsequent solidification phenomenon. Upon the formation of the solidified layer 24 through such phenomenon, a shrinkage stress can occur due to a reduced void between particles of the powder material (FIG. 7A). As a result, the integrated object of the three-dimensional shaped object 100 and the base plate 21 (i.e., a platform for the object 100) becomes susceptible to a warp deformation (FIG. 7B). This will bring concern that a desired shape of the three-dimensional shaped object 100 cannot be provided.

Under these circumstances, the present invention has been created. That is, an object of the present invention is to provide a manufacturing method of a three-dimensional shaped object, the method being capable of reducing a warp deformation of the three-dimensional shaped object.

Means for Solving the Problems

In order to achieve the above object, an embodiment of the present invention provides a method for manufacturing a three-dimensional shaped object by alternate repetition of a powder-layer forming and a solidified-layer forming, the repetition being performed on a base plate, comprising:

(i) forming a solidified layer by irradiating a predetermined portion of a powder layer with a light beam, thereby allowing a sintering of the powder in the predetermined portion or a melting and subsequent solidification of the powder in the predetermined portion; and (ii) forming another solidified layer by newly forming a powder layer on the formed solidified layer, followed by irradiation of a predetermined portion of the newly formed powder layer with the light beam, wherein the forming of at least one prior solidified layer is performed under a higher temperature condition than that for the forming of a subsequent solidified layer, the at least one prior solidified layer being formed prior to the subsequent solidified layer.

Effect of the Invention

In accordance with the manufacturing method of the present invention, the three-dimensional shaped object can be obtained with its warp deformation being reduced.

BRIEF DESCRIPTION OF THE DRAWINGS

FIG. 1 is a cross-sectional view schematically showing a general concept of the present invention.

FIGS. 2A-2C are cross-sectional views schematically showing a manufacturing method of the present invention over time wherein FIG. 2A shows a forming of a prior solidified layer, FIG. 2B shows a forming of a subsequent solidified layer, and FIG. 2C shows a completion of a manufacturing of a three-dimensional shaped object.

FIGS. 6A-6C include cross-sectional views schematically illustrating a laser-sintering/machining hybrid process for a selective laser sintering method wherein FIG. 6A shows a powder-layer forming, FIG. 6B shows a solidified-layer forming, and FIG. 6C shows a stacking of solidified layers.

FIGS. 7A and 7B are cross-sectional views schematically illustrating a phenomenon of a warp deformation during a selective laser sintering method wherein FIG. 7A shows a solidified layer with a shrinkage stress occurring therein, and FIG. 7B shows the warp deformation of a three-dimensional shaped object.

MODES FOR CARRYING OUT THE INVENTION

Figure 2A:
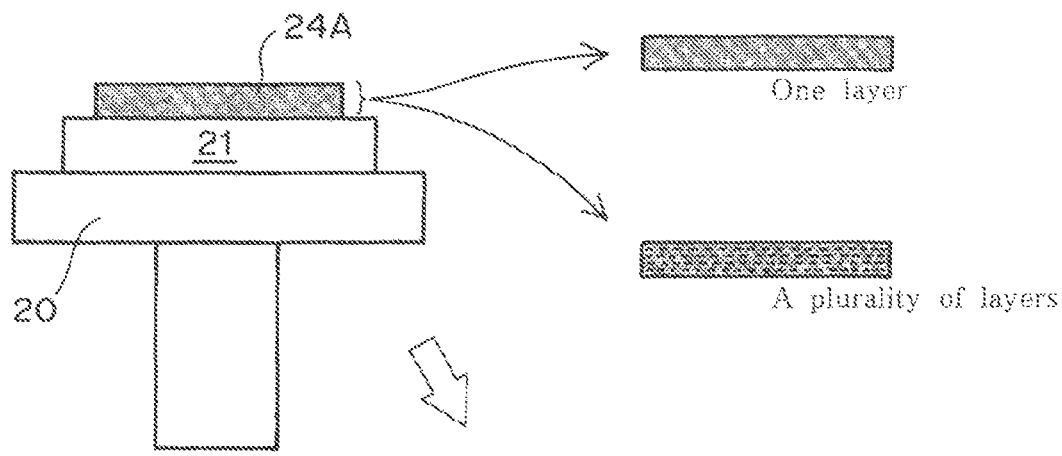

The present invention according to an embodiment thereof will be described in more detail with reference to the accompanying drawings. It should be noted that configurations/forms and dimensional proportions in the drawings are merely for illustrative purposes, and thus not the same as those of the actual parts or elements.

The term "powder layer" as used in this description and claims means a "metal powder layer made of a metal powder" or "resin powder layer made of a resin powder", for example. The term "predetermined portion of a powder layer" as used herein substantially means a portion of a three-dimensional shaped object to be manufactured. As such, a powder present in such predetermined portion is irradiated with a light beam, and thereby the powder undergoes a sintering or a melting and subsequent solidification to give a shape of a three-dimensional shaped object. Furthermore, the term "solidified layer" substantially means a "sintered layer" in a case where the powder layer is a metal powder layer, whereas term "solidified layer" substantially means a "cured layer" in a case where the powder layer is a resin powder layer.

The directions of "upper" and "lower", which are directly or indirectly used herein, are ones based on a positional relationship between a base plate and a three-dimensional shaped object. The side in which the manufactured three-dimensional shaped object is positioned with respect to the based plate is "upper", and the opposite direction thereto is "lower".

[Selective Laser Sintering Method]

Figure 6A:
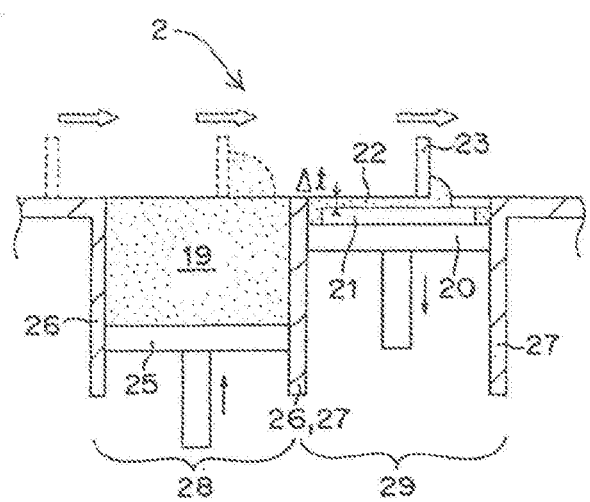
Figure 6B:
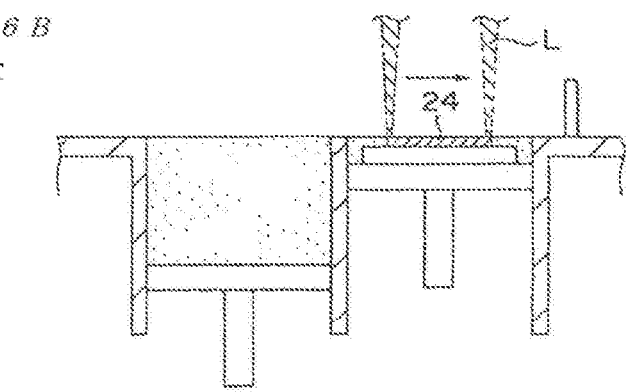
Figure 6C:
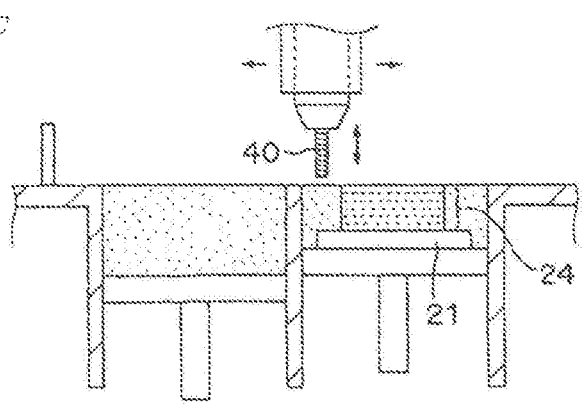
Figure 8:
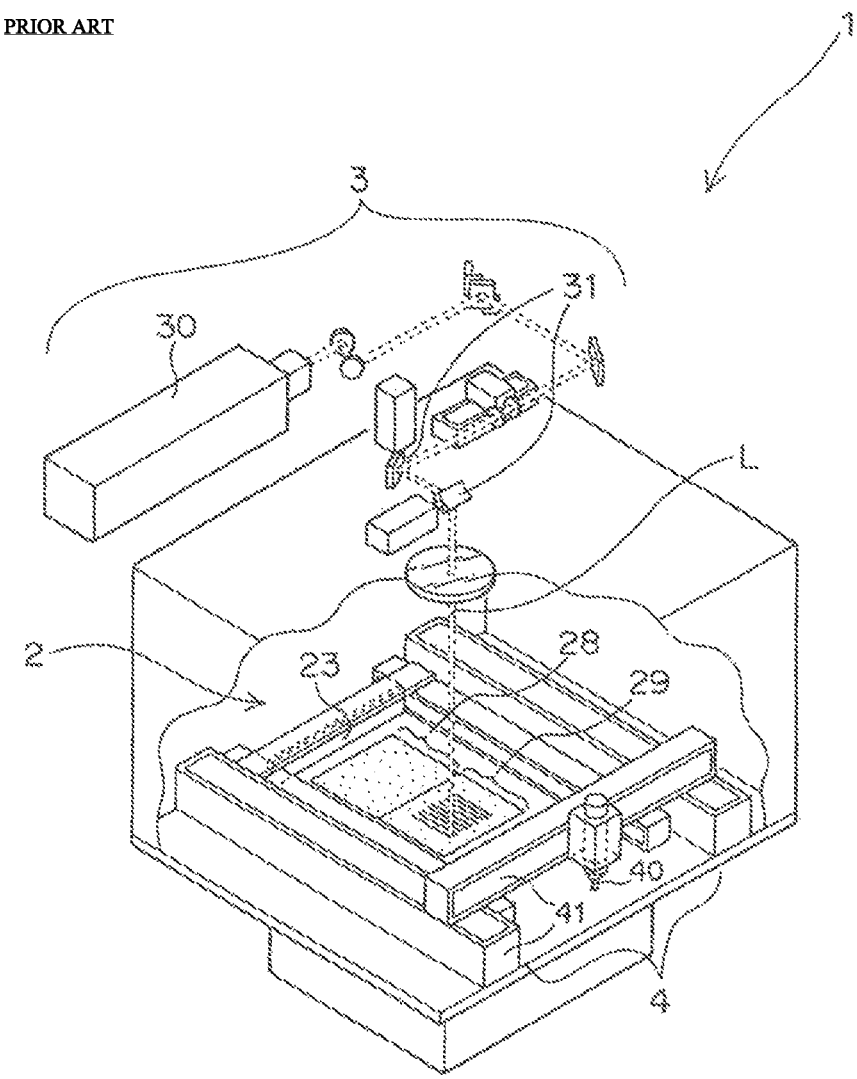
FIG. 8 is a perspective view schematically illustrating a construction of a laser-sintering/machining hybrid machine.
Figure 9:
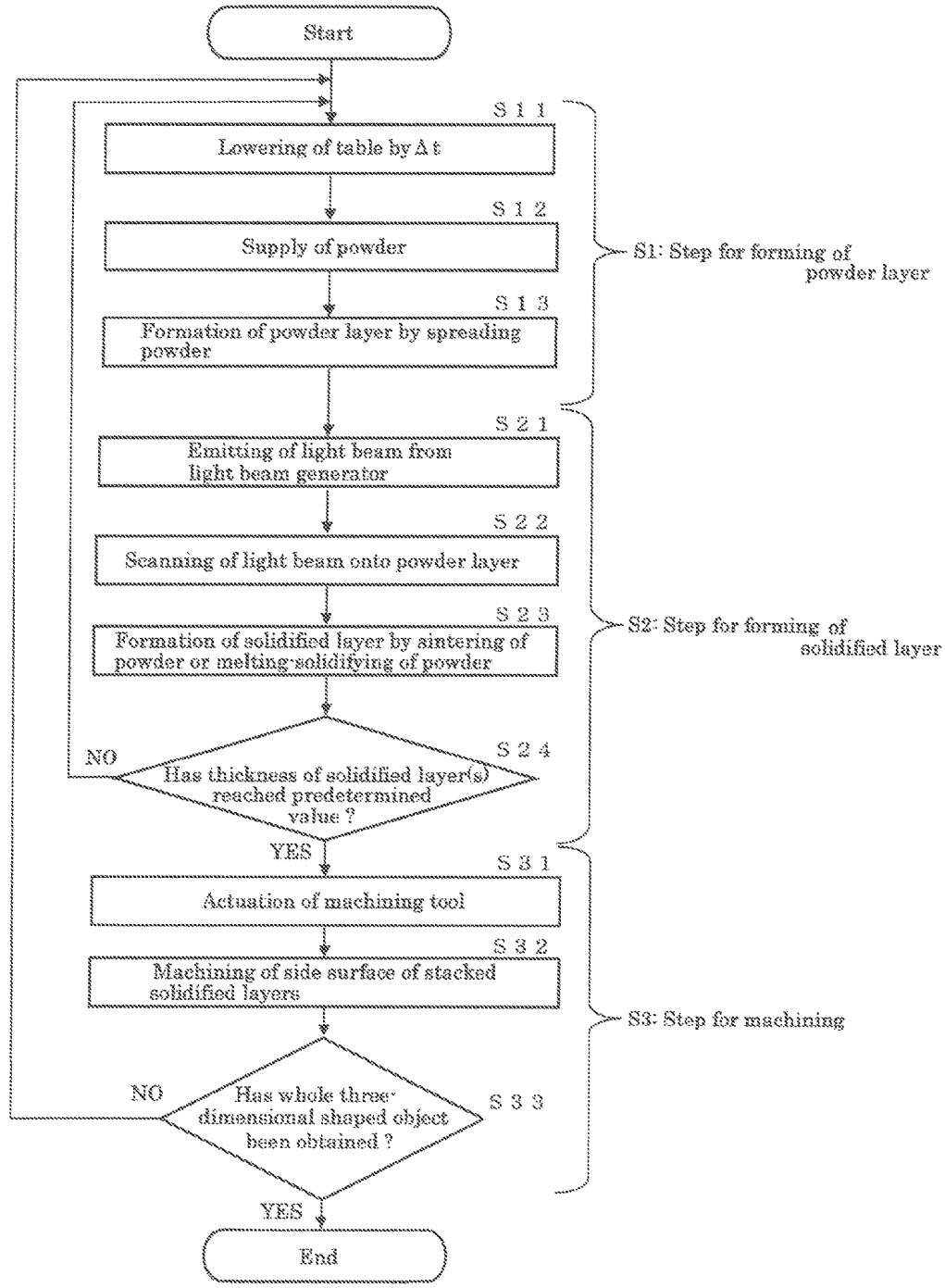
FIG. 9 is a flow chart of general operations of a laser-sintering/machining hybrid machine.

First of all, a selective laser sintering method, on which the manufacturing method of the present invention is based, will be described. By way of example, a laser-sintering/machining hybrid process wherein a machining is additionally carried out in the selective laser sintering method will be especially explained. FIGS. 6A-6C schematically show a process embodiment of the laser-sintering/machining hybrid. FIGS. 8 and 9 respectively show major constructions and operation flow regarding a laser-sintering/milling hybrid machine for enabling an execution of a machining process as well as the selective laser sintering method.

As shown in FIG. 8, the laser-sintering/milling hybrid machine 1 is provided with a powder layer former 2, a light-beam irradiator 3, and a machining means 4.

The powder layer former 2 is a means for forming a powder layer with its predetermined thickness through a supply of powder (e.g., a metal powder or a resin powder). The light-beam irradiator 3 is a means for irradiating a predetermined portion of the powder layer with a light beam "L". The machining means 4 is a means for milling the side surface of the stacked solidified layers, i.e., the surface of the three-dimensional shaped object.

As shown in FIGS. 6A-6C, the powder layer former 2 is mainly composed of a powder table 25, a squeegee blade 23, a forming table 20 and a base plate 21. The powder table 25 is a table capable of vertically elevating/descending in a "storage tank for powder material" 28 whose outer periphery is surrounded with a wall 26. The squeegee blade 23 is a blade capable of horizontally moving to spread a powder 19 from the powder table 25 onto the forming table 20, and thereby forming a powder layer 22. The forming table 20 is a table capable of vertically elevating/descending in a forming tank 29 whose outer periphery is surrounded with a wall 27. The base plate 21 is a plate for a three-dimensional shaped object. The base plate is placed on the forming table 20 and serves as a platform of the three-dimensional shaped object.

As shown in FIG. 8, the light-beam irradiator 3 is mainly composed of a light beam generator 30 and a galvanometer mirror 31. The light beam generator 30 is a device for emitting a light beam "L". The galvanometer mirror 31 is a means for scanning an emitted light beam "L" onto the powder layer 22, i.e., a scan means of the light beam "L".

As shown in FIG. 8, the machining means 4 is mainly composed of an end mill 40 and an actuator 41. The end mill 40 is a cutting tool for milling the side surface of the stacked solidified layers, i.e., the surface of the three-dimensional shaped object. The actuator 41 is a means for driving the end mill 40 to move toward the position to be milled.

Operations of the laser-sintering/milling hybrid machine 1 will now be described in detail. As can be seen from the flowchart of FIG. 9, the operations of the laser-sintering/milling hybrid machine 1 are mainly composed of a powder layer forming step (S1), a solidified layer forming step (S2), and a machining step (S3). The powder layer forming step (S1) is a step for forming the powder layer 22. In the powder layer forming step (S1), first, the forming table 20 is descended by Δt (S11), and thereby creating a level difference Δt between an upper surface of the base plate 21 and an upper-edge plane of the forming tank 29. Subsequently, the powder table 25 is elevated by Δt, and then the squeegee blade 23 is driven to move from the storage tank 28 to the forming tank 29 in the horizontal direction, as shown in FIG. 6A. This enables a powder 19 placed on the powder table 25 to be spread onto the base plate 21 (S12), while forming the powder layer 22 (S13). Examples of the powder for the powder layer 22 include a "metal powder having a mean particle diameter of about 5 μm to 100 μm" and a "resin powder having a mean particle diameter of about 30 μm to 100 μm (e.g., a powder of nylon, polypropylene, ABS or the like". Following this step (i.e., the forming step for forming the powder layer 22), the solidified layer forming step (S2) is performed. The solidified layer forming step (S2) is a step for forming a solidified layer 24 through the light beam irradiation. In the solidified layer forming step (S2), a light beam "L" is emitted from the light beam generator 30 (S21).

The emitted light beam "L" is scanned onto a predetermined portion of the powder layer 22 by the galvanometer mirror 31 (S22). The scanned light beam can cause the powder in the predetermined portion of the powder layer 22 to be sintered or be melted and subsequently solidified, resulting in a formation of the solidified layer 24 (S23), as shown in FIG. 6B. Examples of the light beam "L" include carbon dioxide gas laser, Nd:YAG laser, fiber laser, ultraviolet light, and the like.

The powder layer forming step (S1) and the solidified layer forming step (S2) are alternately repeated. This allows a plurality of the solidified layers 24 to be integrally stacked with each other, as shown in FIG. 6C.

When the thickness of the stacked solidified layers 24 reaches a predetermined value (S24), the machining step (S3) is initiated. The machining step (S3) is a step for milling the side surface of the stacked solidified layers 24, i.e., the surface of the three-dimensional shaped object. The end mill 40 (see FIG. 6C and FIG. 8) is actuated to initiate an execution of the machining step (S31). For example, in a case where the end mill 40 has an effective milling length of 3 mm, a machining can be performed with a milling depth of 3 mm. Therefore, supposing that "Δt" is 0.05 mm, the end mill 40 is actuated when the formation of the sixty solidified layers 24 is completed. Specifically, the side face of the stacked solidified layers 24 is subjected to the surface machining (S32) through a movement of the end mill 40 driven by the actuator 41. Subsequent to the surface machining step (S3), it is judged whether or not the whole three-dimensional shaped object has been obtained (S33). When a desired three-dimensional shaped object has not yet been obtained, the step returns to the powder layer forming step (S1). Thereafter, the steps S1 through S3 are repeatedly performed again wherein the further stacking of the solidified layer and the further machining process therefor are similarly performed, which eventually leads to a provision of the desired three-dimensional shaped object.

[Manufacturing Method of the Present Invention]

The present invention is characterized by a forming embodiment of the solidified layers in the selective laser sintering method.

Figure 4:
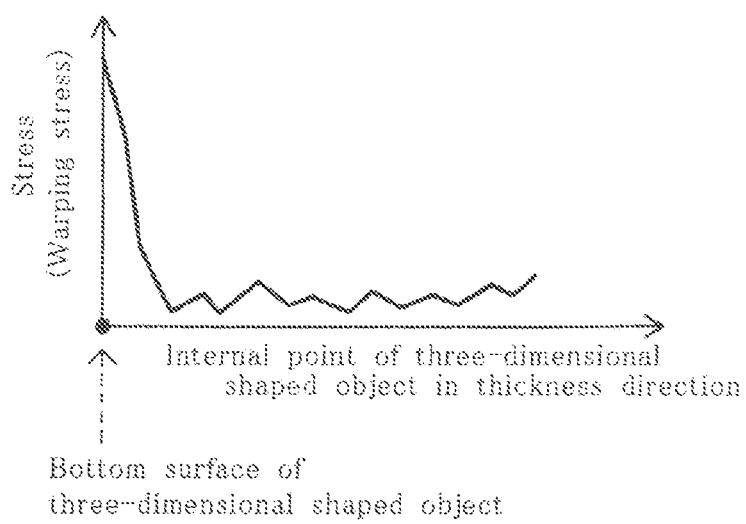
FIG. 4 is a graph showing a warping stress that can occur in a three-dimensional shaped object.

Specifically, the present invention relatively changes a temperature condition for the formation of a plurality of the solidified layers of which a three-dimensional shaped object is composed. As shown in FIG. 1, the forming of at least one prior solidified layer 24A is performed under a higher temperature condition than that for the forming of a subsequent solidified layer 24B, the at least one prior solidified layer 24A being formed prior to the subsequent solidified layer 24B. This means that a prior solidified layer(s) which is/are provided earlier in terms of time is/are formed under a condition of a higher temperature than that for a subsequent solidified layer(s) which is/are provided later in terms of time and subsequent to the formation of the prior solidified layer(s). The inventors of the present application have found that there can be an inward stress that occurs especially in a boundary region between the base plate and the three-dimensional shaped object (see FIG. 4), the inward stress being a possible main factor of causing a warp deformation of the finally obtained three-dimensional shaped object. Through addressing such inward stress of the boundary region to reduce it, the inventors have created the present invention specifically on the basis of the concept of how to form a force in a direction opposite to the direction of the inward stress of the boundary region.

Figure 2B:
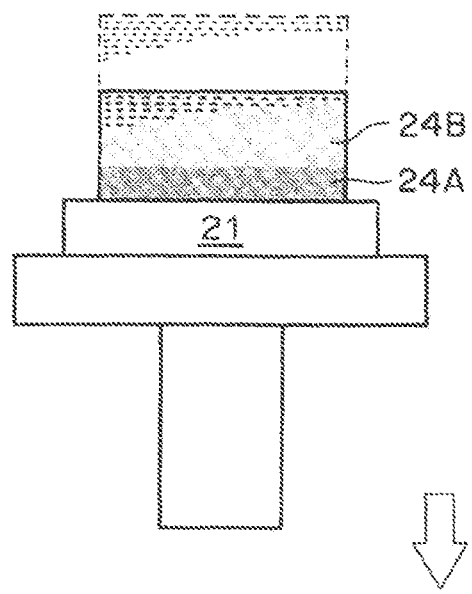
Figure 2C:
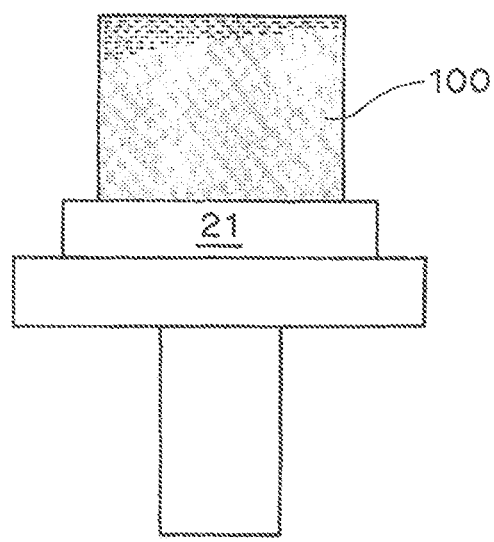

The present invention will now be described with a more detailed embodiment thereof. In the manufacturing method according to the present invention, the prior solidified layer(s) 24A is/are formed on the base plate 21 under the relatively high temperature condition (see FIG. 2A). Subsequent to the formation of the prior solidified layer(s) 24A, the subsequent solidified layer(s) 24B is/are formed on the prior solidified layer(s) 24A under the relatively low temperature condition (see FIG. 2B). The repetition of the formation of the subsequent solidified layer 24B eventually leads to a production of a three-dimensional shaped object 100 (FIG. 2C). As such, the present invention has a technical concept that the bottom-side solidified layer(s) to be positioned at the bottom side of the three-dimensional shaped object is/are formed proactively under a different condition of temperature from that of the solidified layer(s) other than the bottom-side one(s).

The term "prior" as used herein means "preceding" in time, and thus the term "prior solidified layer" as used herein refers to a solidified layer to be formed in a relatively early stage. While on the other hand, the term "subsequent" as used herein means "late"/"following" in time, and thus the term "subsequent solidified layer" as used herein refers to a solidified layer to be formed in a relatively late stage.

The phrase "a higher temperature condition"/"relatively high temperature condition" as used herein means, in a broader sense, that the temperature is higher at a point in time when the solidified layer is/are formed. Such phrase means, in a narrower sense, that the temperature of a powder layer for the formation of the solidified layer (i.e., temperature of the powder layer corresponding to a precursor layer for the solidified layer) is high. Thus, as a typical example, the phrase "a higher temperature condition"/"relatively high temperature condition" as used herein means that the powder layer(s) for the prior solidified layer(s) has/have a higher temperature than that of the powder layer(s) for the subsequent solidified layer(s).

The higher temperature condition may be created by a temperature of the base plate. That is, the relatively high temperature condition for the forming of the prior solidified layer(s) may be provided by the temperature of the base plate. The prior solidified layer(s) is/are formed directly on the base plate. It is thus preferred that a heat of the base plate transfers to the "powder layer(s) for the formation of the solidified layer(s)" to allow the "higher temperature condition" to be provided. In this case, it is required for the base plate to have a high temperature. It is thus preferred that the base plate is heated. The heating of the base plate makes it possible for the temperature of the base plate to be elevated. As a result, the heat transfer then occurs from the base plate with its elevated temperature toward the "powder layer(s) for the formation of the prior solidified layer(s)", and thereby the "higher temperature condition" can be achieved.

Figure 3:
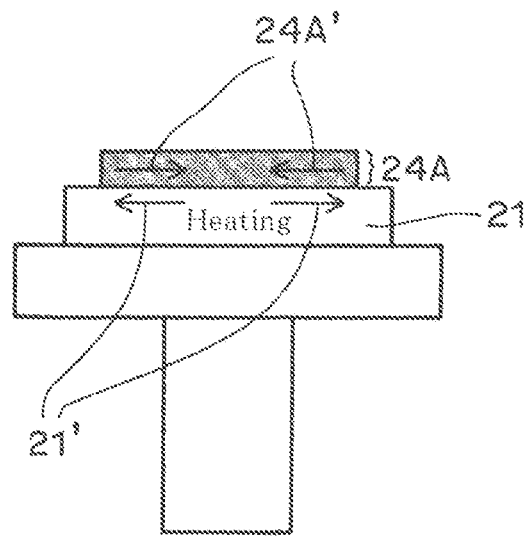
FIG. 3 is a cross-sectional view schematically showing a stress that can occur in a base plate and a prior solidified layer.
Figure 7A:
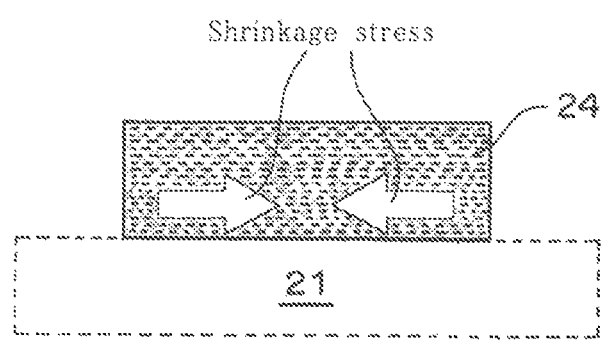
Figure 7B:
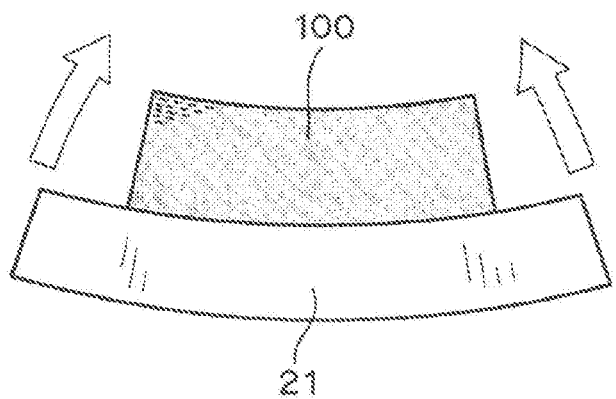

According to the manufacturing method of the present invention, the formation of the prior solidified layer(s) under the higher temperature condition than that for the subsequent solidified layer(s) makes it possible to reduce the warp deformation in the finally produced three-dimensional shaped object. While not wishing to be bound by any theory, an assumed mechanism for the reduced deformation of the shaped object will be now described in detail. In a case where the forming of the prior solidified layer(s) under the condition of the relatively high temperature is performed, the base plate having the elevated temperature therefor tends to allow an outward stress to occur therein due to a thermal expansion of the plate. While on the other hand, the formation of the prior solidified layer can bring about a shrinkage stress in such solidified layer 24, for example due to a reduced void between particles of the powder material, the reduced void being more or less concerned with the phenomenon which has been explained above with reference to FIGS. 7A and 7B. As shown in FIG. 3, the stress 21' generated in the base plate 21 having its elevated temperature, which is attributed to the thermal expansion of the plate, is in an expansion direction, i.e., in an outward direction. Such outward direction of the stress 21' in the base plate is opposite to the direction of the stress 24A' generated in the prior solidified layer(s). As such, an offset effect between these stresses (21', 24A') can be brought about during the manufacturing of the three-dimensional shaped object, which can lead to a prevention of the warp deformation of the three-dimensional shaped object.

It may be conceivable that the forming of the subsequent solidified layer(s) is also performed at a high temperature similar to that of the forming of the prior solidified layer(s). In this regard, it has been however found that a stress generated during the manufacturing of the three-dimensional shaped object is larger at an earlier stage of the manufacturing, and thereafter becomes smaller later (see FIG. 4). More specifically, as can be seen from FIG. 4, the large stress occurs especially near the bottom surface of the three-dimensional shaped object. Such stress becomes smaller with increasing distance from the bottom surface of the three-dimensional shaped object. This means that a stress occurred at the time of the forming of the subsequent solidified layer is not so large. The high temperature itself is not favorable factor since it may adversely affect the dimension of the three-dimensional shaped object. It is therefore not necessary for the temperature condition of the subsequent solidified layer(s) to be made higher than that of the prior solidified layer. Consequently, the present invention applies the relatively high temperature condition to only the forming of the prior solidified layer(s).

In consideration of such a phenomenon that the large stress occurs near the bottom surface of the three-dimensional shaped object (see FIG. 4), it is preferred that the height level regarding the prior solidified layer(s) to be formed under the relatively high temperature condition is within a certain range. That is, the thickness of the at least one prior solidified layer may be within a predetermined height range with respect to the base plate in the manufacturing method of the present invention. As an example, the thickness of the at least one prior solidified layer is, but not limited to, within the height range of 5 mm with respect to the upper surface of the base plate. In this case, the solidified layer(s) to be positioned within 5 mm from the upper surface of the base plate undergo(es) the relatively high temperature. For example in a case where one solidified layer has the thickness of 0.05 mm, 1 to 100 layers of the solidified layers may be formed under such relatively high temperature condition.

In a preferred embodiment of the present invention, a heating of the base plate is initiated before the formation of a first layer ($1^{st}$ layer) of the powder layer, the first layer being in contact with the base plate. This means that the base plate is started to be heated at a point in time before the first layer of the powder layer to be used for the at least one prior solidified layer is formed. The resulting elevated temperature of the base plate makes it possible to more suitably generate the outward stress 21' in the base plate 21 to act against the large stress 24A' generated near the bottom surface of the three-dimensional shaped object (see FIG. 3), which will lead to a more efficient prevention of the warp deformation of the three-dimensional shaped object.

Now, the manufacturing method according to one embodiment of the present invention over time will be described below.

(1) Provision of Base Plate

First, the base plate is provided. The base plate may be one used conventionally in the selective laser sintering method. For example in a case where a metal powder is used as the powder so as to form a sintered layer as the solidified layer (i.e., sintered layer made of an iron-based material), the base plate is preferably made of at least one material selected from the group consisting of a steel, a hardmetal (cemented carbide), a high-speed tool steel, an alloy tool steel, a stainless steel, and a carbon steel for machine construction. It is preferred that the base plate typically has a flattened form as a whole because of "plate". The specific form of the base plate is not particularly limited as long as it serves as a platform for the three-dimensional shaped object. Thus, the form of the base plate is not limited to a cuboid form, but may be a disc form, a polygonal column form or the like.

(2) Heating of Base Plate

Then, the base plate is subjected to a heat treatment. The heating of the base plate allows the base plate to have its elevated temperature, and thereby a thermal expansion occurs in the base plate. The thermal expansion of the base plate allows the stress to occur in an expansion direction, i.e., in outward direction.

Examples of the heating of the base plate include, but not limited to, the following:

Partial heating of the base plate by irradiating the surface of the base plate with the light beam;

Whole heating of the base plate by use of a heater provided in the interior and/or lateral surface of the base plate;

Whole heating of the base plate by use of a heater provided in the interior or lateral surface of a forming table by which the base plate is supported;

Whole heating of the base plate by forcing warm/hot water or steam to flow through a temperature-regulation conduit located in the interior of a forming table by which the base plate is supported;

Whole or partial heating of the base plate by infrared radiation; and

Whole or partial heating of the base plate by electromagnetic induction heating.

The term "whole heating" as used above means that the base plate has its elevated temperature as a whole such that the heat reaches the central portion of the base plate.

Figure 5:
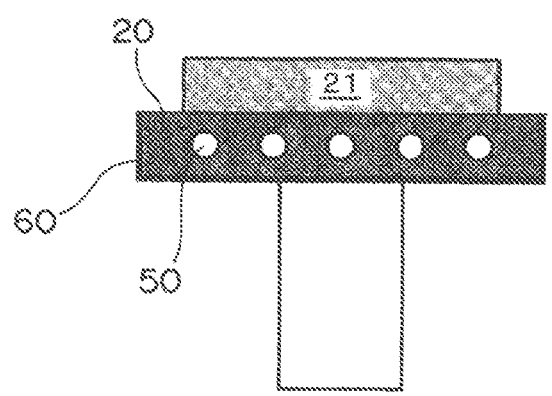
FIG. 5 is a cross-sectional view schematically showing a heating means for a base plate.

In a case of the use of the heater built in the interior of the forming table, and also the warm/hot water or steam flowing through the temperature-regulation conduit of the forming table, a particular region adjacent to the bottom and lateral surfaces of the forming table may be undesirably affected by the thermal effect attributed thereto. In order to mitigate such adverse thermal effect, a heat insulating material 60 may be provided in the bottom and lateral surfaces of the forming table equipped with the heater or the temperature-regulation conduit 50. See FIG. 5. As the heat insulating material 60, a resin material may be used, for example.

(3) Formation of Prior Solidified Layer

On the base plate 21 having its elevated temperature due to the heating treatment, the powder layer is formed. Then, such powder layer is irradiated with the light beam, and thereby forming the prior solidified layer 24A (See FIG. 2A). Since the powder layer for the formation of the prior solidified layer 24A is in a contact with the base plate 21, the heat from the temperature-elevated base plate 21 transfers to such powder layer. In this way, the forming of the prior solidified layer 24A can be suitably performed while the powder layer therefor has the high temperature, especially a higher temperature than that of the powder layer for the forming of the subsequent solidified layer. In other words, the powder layer having its relatively high temperature is irradiated with the light beam to provide the prior solidified layer 24A.

The prior solidified layer 24A may be one layer. Alternatively, the prior solidified layer 24A may also be a plurality of layers. See the extracted illustrations in FIG. 2A. As an example, the number of the solidified layers 24A may be, but not limited to, 1 to 100, preferably 1 to 50, more preferably 1 to 20.

(4) Formation of Subsequent Solidified Layer

Subsequent to the formation of the prior solidified layer(s) 24A, a new powder layer is formed on such prior solidified layer(s) 24A. The new powder layer is then irradiated with the light beam to form the subsequent solidified layer 24B (see FIG. 2B). The repetition of the forming of the subsequent layer 24B can lead to a production of the three-dimensional shaped object 100 (see FIG. 2C). In this regard, it is general that the "high temperature" itself is not preferred in terms of an accuracy of dimension of the shaped object. As such, there is no need to make the temperature condition of the subsequent solidified layer 24B higher than that of the prior solidified layer 24A. In view of an avoidance of unnecessary thermal expansion of the subsequent solidified layer(s) 24B, it is preferred that the forming of the subsequent solidified layer 24B, which follows the forming of the prior solidified layer 24A, is performed under a lower temperature condition than that of the prior solidified layer 24A. Specifically, the forming of the subsequent solidified layer 24B may be performed at the relatively low temperature which is lower than that of the prior solidified layer 24A by less than 100° C. This means that the forming of the prior solidified layer 24A is performed under the higher temperature condition than that of the subsequent solidified layer 24B such that the difference in temperature between the forming of the prior solidified layer 24A and the subsequent solidified layer 24B is less than 100° C., for example.

While several embodiments of the present invention have been hereinbefore described as a typical example, various specific other embodiments can also be possible.

(Measurement of Relatively High Temperature)

The present invention comprises a forming of the prior solidified layer under the higher temperature condition than that of the subsequent solidified layer. In this regard, it is generally hard to directly control the temperature conditions for the prior and subsequent solidified layers. As such, in order to control the temperature conditions of the prior and subsequent solidified layers, a set temperature of a heater or the like built in the base plate which comes into contact with the prior solidified layer may be suitably adjusted. Alternatively, a set temperature of a heater or the like built in the forming table which is positioned immediately under the base plate may also be suitably adjusted in order to control the temperature conditions of the prior and subsequent solidified layers. In other words, it is possible for the set temperature of the source of heat in the base plate or the forming table to be made higher at the time of the forming of the prior solidified layer than that at the time of the forming of the subsequent solidified layer in order to give the relatively high temperature condition.

(Light Irradiation Condition According to Thermal Expansion of Base Plate)

In a case where the relatively high temperature condition is created by the heating of the base plate, the powder layer on the base plate might be formed with ununiform thickness thereof. In this case, a spaced distance between the squeegee blade and the base plate can be measured at a point in time before the forming of the powder layer in order to suitably adjust an irradiation condition of the light beam with respect to the local portion of the powder layer, depending on the measured distance. This makes it possible to reduce such an undesirable phenomenon that the density of the solidified layer varies according to the difference in the local thickness of the powder layer. More detail on this will be described. When the spaced distance between the squeegee blade and the base plate is smaller, a higher scanning speed of the light beam or a smaller power of the light beam irradiation may be applied to a local portion of the powder layer, the local portion being involved in the smaller spaced distance. On the other hand, when the spaced distance between the squeegee blade and the base plate is larger, a lower scanning speed of the light beam or a larger power of the light beam irradiation may be applied to a local portion of the powder layer, the local portion being involved in the larger spaced distance.

Although some embodiments of the present invention have been hereinbefore described, these are regarded merely as typical ones, and thus the present invention is not limited to such embodiments. It will be readily appreciated by those skilled in the art that various modified embodiments are possible without departing from the scope of the present invention.

It should be noted that the present invention as described above includes the following suitable aspects:

The First Aspect:

A method for manufacturing a three-dimensional shaped object by alternate repetition of a powder-layer forming and a solidified-layer forming on a base plate, the repetition comprising:

(i) forming a solidified layer by irradiating a predetermined portion of a powder layer with a light beam, thereby allowing a sintering of the powder in the predetermined portion or a melting and subsequent solidification of the powder in the predetermined portion; and (ii) forming another solidified layer by newly forming a powder layer on the formed solidified layer, followed by irradiation of a predetermined portion of the newly formed powder layer with the light beam, wherein the forming of at least one prior solidified layer is performed under a higher temperature condition than that for the forming of a subsequent solidified layer, the at least one prior solidified layer being formed prior to the subsequent solidified layer.

The Second Aspect:

The method according to the first aspect, wherein a thickness of the at least one prior solidified layer is within a predetermined height range with respect to the base plate.

The Third Aspect:

The method according to the first or second aspect, wherein the higher temperature condition is created by a temperature of the base plate.

The Fourth Aspect:

The method according to the third aspect, wherein a heating of the base plate is initiated prior to the formation of a first layer of the powder layer, the first layer being in direct contact with the base plate.

INDUSTRIAL APPLICABILITY

The manufacturing method according to an embodiment of the present invention can provide various kinds of articles. For example, in a case where the powder layer is a metal powder layer (i.e., inorganic powder layer) and thus the solidified layer corresponds to a sintered layer, the three-dimensional shaped object obtained by the present invention can be used as a metal mold for a plastic injection molding, a press molding, a die casting, a casting or a forging. While on the other hand in a case where the powder layer is a resin powder layer (i.e., organic powder layer) and thus the solidified layer corresponds to a cured layer, the three-dimensional shaped object obtained by the present invention can be used as a resin molded article.

CROSS REFERENCE TO RELATED PATENT APPLICATION

The present application claims the right of priority of Japanese Patent Application No. 2016-045898 (filed on Mar. 9, 2016, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

21 Shaped object
24A Prior solidified layer(s)
24B Subsequent solidified layer(s)
100 Three-dimensional shaped object

The invention claimed is:

1. A method for manufacturing a three-dimensional shaped object by alternate repetition of a powder-layer forming and a solidified-layer forming on a base plate, the repetition comprising:
  (i) forming a solidified layer by irradiating a predetermined portion of a powder layer with a light beam, thereby allowing a sintering of the powder in the predetermined portion or a melting and subsequent solidification of the powder; and
  (ii) forming another solidified layer by newly forming a powder layer on the formed solidified layer, followed by irradiation of a predetermined portion of the newly formed powder layer with the light beam,
  wherein the forming of at least one prior solidified layer is performed under a higher temperature condition than that for the forming of a subsequent solidified layer such that a warp deformation of the three-dimensional shaped object is reduced,
  the at least one prior solidified layer being formed prior to the subsequent solidified layer, and
  wherein a thickness of the at least one prior solidified layer formed under the higher temperature condition is within a height range of 5 mm with respect to an upper surface of the base plate.

2. The method according to claim 1, wherein the higher temperature condition is created by a temperature of the base plate.

3. The method according to claim 2, wherein a heating of the base plate is initiated before the formation of a first layer of the powder layer, the first layer being in contact with the base plate.

* * * * *